United States Patent [19]
Palazzolo et al.

[11] Patent Number: 6,120,100
[45] Date of Patent: Sep. 19, 2000

[54] COMPOSITE BLOW MOLDED ARTICLE AND METHOD OF MAKING SAME

[75] Inventors: Gasper J. Palazzolo, Williamston; Michael P. Leitert, Okemos; W. Daniel Panter, Commerce Township; Edward R. Terris, East Lansing, all of Mich.

[73] Assignee: Collins & Aikman Plastics, Inc., Troy, Mich.

[21] Appl. No.: 09/280,137

[22] Filed: Mar. 26, 1999

[51] Int. Cl.[7] .................................................. A47C 7/36
[52] U.S. Cl. .................. 297/391; 297/220; 264/46.4; 264/46.6; 264/46.7
[58] Field of Search .................................. 297/391, 220; 264/46.7, 46.6, 46.4

[56] References Cited

U.S. PATENT DOCUMENTS

| 3,258,511 | 6/1966 | McGregor, Jr. | 264/45 |
|---|---|---|---|
| 3,650,561 | 3/1972 | Faust et al. | 297/391 |
| 4,115,170 | 9/1978 | Sanson | 156/79 |
| 4,144,604 | 3/1979 | Fritschi | 5/360 |
| 4,247,347 | 1/1981 | Lischer et al. | 156/79 |
| 4,251,476 | 2/1981 | Smith | 264/46.7 |
| 4,268,557 | 5/1981 | Bracesco | 428/71 |
| 4,559,094 | 12/1985 | Hostetler et al. | 156/212 |
| 4,738,809 | 4/1988 | Storch | 264/46.6 |
| 4,891,081 | 1/1990 | Takashashi et al. | 156/78 |
| 5,129,705 | 7/1992 | Wray | 297/397 |
| 5,178,807 | 1/1993 | Thary | 264/46.4 |
| 5,261,726 | 11/1993 | Yanagishita | 297/391 |
| 5,452,939 | 9/1995 | Kupisz et al. | 297/391 |
| 5,478,136 | 12/1995 | Takeuchi et al. | 297/391 |
| 5,681,087 | 10/1997 | Yamano et al. | 297/391 |

Primary Examiner—Peter M. Cuomo
Assistant Examiner—Rodney B. White
Attorney, Agent, or Firm—Bliss McGlynn, P.C.

[57] ABSTRACT

A head rest assembly is fabricated using a blow molding process. A skin surrounds a foam cushion and an insert is secured to the skin. The insert and the skin may be flush with each other. The skin includes a channel designed to receive the peripheral edge of the insert therein. The recess undercuts the opening periphery of the skin by 285°. The insert is adhered to the skin either after the molding of the skin or, in the alternative, during the molding of the skin.

22 Claims, 4 Drawing Sheets

COMPOSITE BLOW MOLDED ARTICLE AND METHOD OF MAKING SAME

BACKGROUND OF THE INVENTION

1. Field of the Invention

The invention relates to composite blow molded articles. More specifically, the invention relates to composite blow molded articles used in motor vehicles.

2. Description of the Related Art

There are several methods by which components found in the passenger compartment of a motor vehicle may be manufactured. The method of choice depends on cost and finish. One method of manufacturing such items as head rests, arms rests, instrument panels and the like is blow molding. Blow molding is the term which is generally used to describe a type of thermoplastic manufacturing process. A parison is a thermoplastic tube or bag which is heated and extruded through a die. A fluid, typically pressurized air, fills the parison and stretches it to a desired size. Wall thickness is determined by the die design but can be influenced by the air. The stretched parison is then placed on a mold to be shaped. Once the mold closes around the parison, the parison is pierced by a needle that blows air inside the pinched parison. This is the fluid medium that forms the shape of the skin to that of the mold. Once shaped and cooled, the skin (parison) can be filled or otherwise worked as desired.

U.S. Pat. No. 4,891,081, issued to Takahashi et al. on Jan. 2, 1990, discloses a method for producing a foamed resin molding having a skin and a foam cushion formed within that skin. While this method does not disclose the creation of an article using blow molding, it does disclose the use of inserts which are held in place by the skin to create an appearance of a composite skin. To do this, however, creases must be created in the skin wherein those creases extend over the outer surface of the insert. These creases cannot be made when blow molding. Further, the creases increase the thickness at the periphery of the insert which is an undesired effect.

SUMMARY OF THE INVENTION

A head rest assembly for a vehicular seat is disclosed. The head rest assembly includes a rigid frame including a stem to be received by the vehicular seat. The head rest assembly also includes a foam cushion surrounding a portion of the rigid frame. The foam cushion is disposed adjacent the vehicular seat. A skin covers all of the foam cushion. The skin includes a recess extending into the foam a predetermined length. The recess defines a periphery. The head rest assembly also includes an insert which is fixedly secured to the skin wherein the edges of the insert are received within or disposed inside the channel.

One advantage associated with the invention is the ability to create a blow molded article. Another advantage associated with the invention is the ability to create a composite blow molded article wherein the edges of the inserts that are used to create the outer surface of the blow molded article are hidden inside the blow molded article. Still another advantage associated with the invention is the ability to create a composite blow molded article without the extensive man hours required to cut and sew material therein.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
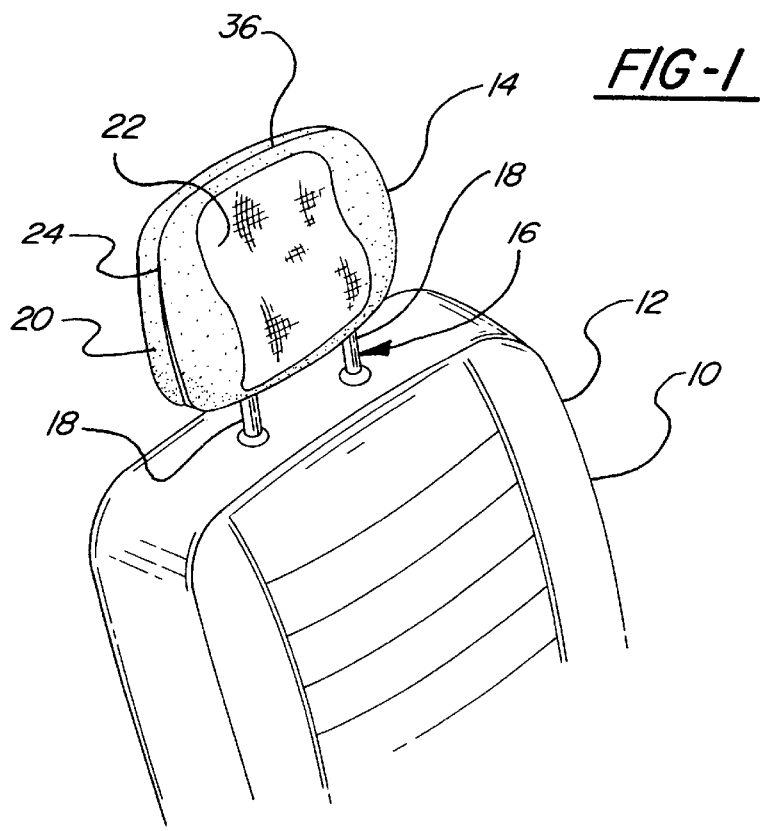
FIG. 1 is a perspective view partially cut away of one embodiment of the invention secured to a vehicular seat.

Referring to FIG. 1, a vehicular seat 10 is shown in a perspective view. The portion of the vehicular seat 10 shown is the seat back 12. Extending into the top of the seat back 12 is a head rest assembly 14. The head rest assembly 14 extends into the seat back 12 via a rigid frame, generally shown at 16. Although not shown, the rigid frame 16 extends into the head rest assembly 14. The rigid frame 16 includes a stem 18 which is received by the vehicular seat 10.

The head rest assembly 14 is the composite blow molded article. While the composite blow molded article is shown as a head rest assembly 14, it will be appreciated by those skilled in the art that items other than the head rest assembly 14 may also be manufactured from a composite blow molded article. While not exhaustive, a list of other items found within the passenger compartment of a motor vehicle (neither shown) include arm rests, visors, console lids and the like.

The composite blow molded article 14 includes a skin 20 and an insert 22. The skin 20 includes a parting line 24 which is created by a mold assembly used to create the composite blow molded article 14. The mold assembly will be discussed in great detail subsequently.

Figure 4:
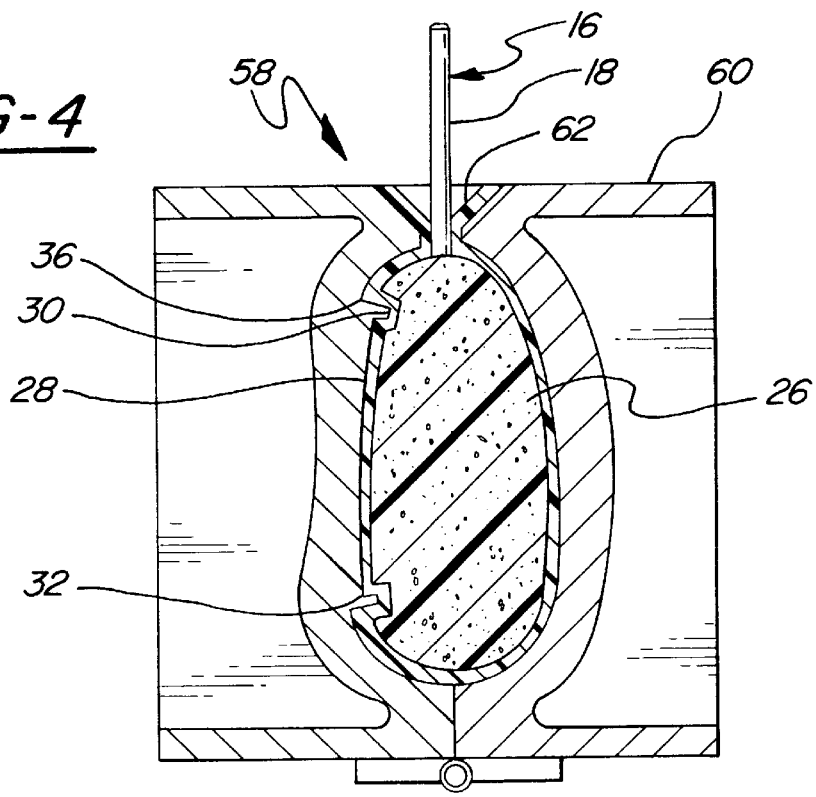
FIG. 4 is a cross-sectional side view of the molded parison inside a foam tool filled with foam.
Figure 5:
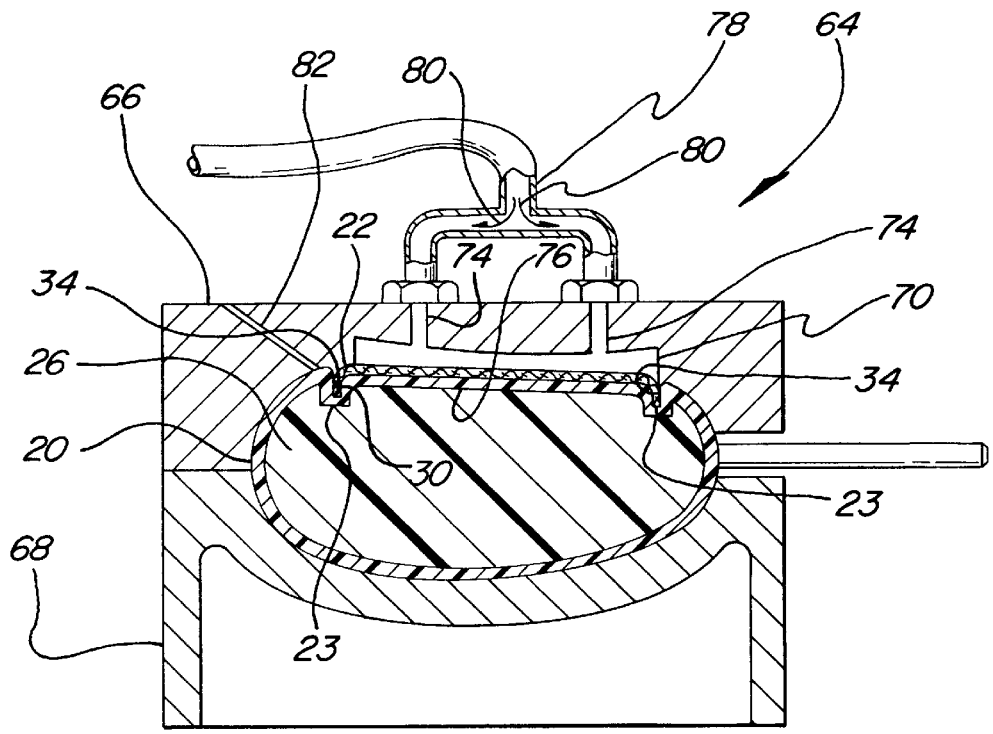
FIG. 5 is a cross-sectional side view of the blow molded, foam filled article in a reactivating apparatus.

As is best seen in FIG. 4, the blow molded article 14 includes a foam cushion 26. The foam cushion 26 provides volume for the composite blow molded article 14. More specifically, the foam cushion 26 fills and supports the skin 20. The foam cushion 26 surrounds a portion of the rigid frame 16. In the embodiment of the vehicular seat 10, the foam cushion 26 is disposed adjacent the seat back 12 of the vehicular seat 10.

The insert 22 includes a peripheral edge 23 and is fixedly secured to a portion or recess 28 in the skin 20. The insert 22 may be fabricated from a material different from the skin 20 or, in the alternative, it may merely be the same material with a different texture or color. In the embodiments shown in the Figures, the insert 22 is a cloth material and the skin 20 is a polyvinyl chloride material, commonly referred to as vinyl.

The recess 28 includes a channel 30 which extends around a recess periphery 32 of the recess 28. The channel 30 extends into the foam cushion 26 a channel length which is greater than a predetermined length into which the recess extends into the skin 20. The channel 30 defines an undercut 34 which is approximately 285° with respect to the skin 20 outside the recess 28. In other words, the undercut extends 15° from the perpendicular to the skin 20 taken at an opening periphery 36 of the skin 20. It may be appreciated that the undercut may extend through a range of 5°–30° with respect to the perpendicular of the skin 20 outside the recess 28.

In one embodiment, the recess 28 extends down into the skin 20 so that the insert 22 is substantially flush with the skin 20 which extends outside the recess 28. In other embodiments, a recess 28 may not be used. A protrusion is an alternative to the recess depending on the design of the blow molded article 14.

Figure 2:
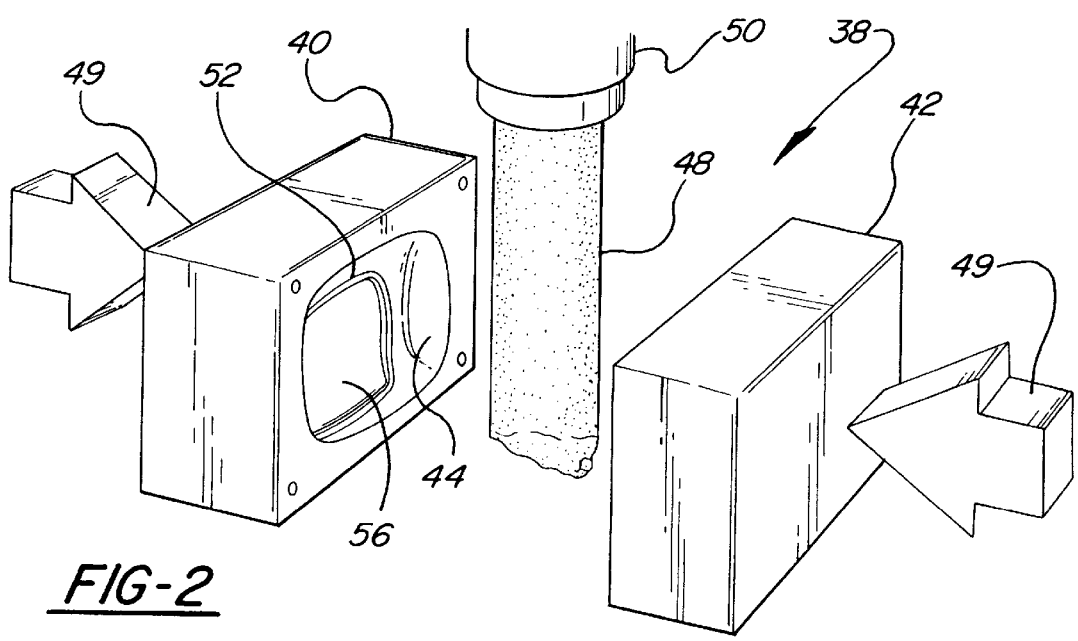
FIG. 2 is a perspective view of a parison being received by a mold assembly.
Figure 3:
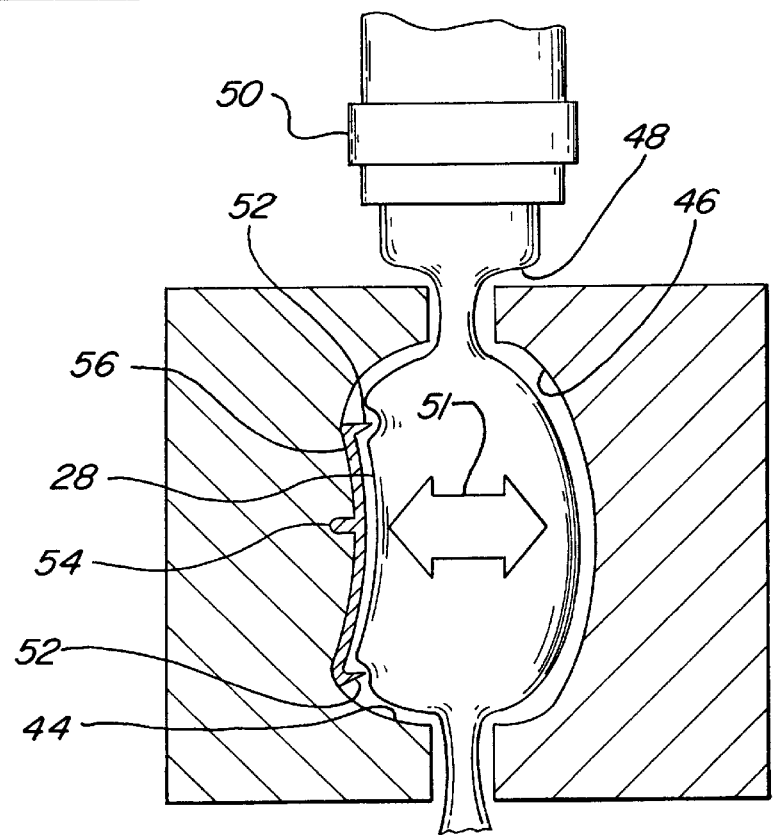
FIG. 3 is a cross-sectional side view of the mold assembly and the parison as it is being molded.

The method for manufacturing the head rest assembly 14 and, generally, a composite blow molded article 14, includes the step of forming the skin 20 with a recess 28. Referring to FIG. 2, a blow mold assembly 38 includes a first half 40 and a second half 42 of a blow mold. The first half 40 and the second half 42 define a first cavity 44 and a second cavity 46. The first 44 and second 46 cavities receive a portion of a parison 48 therein once the halves are moved in a direction indicated by arrows 49. The parison 48 is heated to a near fluid state and subsequently pressurized with a fluid, typically pressurized air, through a parison nozzle 50, as is graphically represented by arrow 51. The first cavity 44 of the first half 40 of the blow mold assembly 38 is designed to define a channel 30 within the skin 20 which is to be formed through the molding process. In one embodiment, the channel producing structure 52 is integral with the first cavity 44. In the embodiment shown in FIGS. 2 through 3, the channel producing structure 52 is a part which is removable from the first cavity 44. The channel producing structure 52 includes a fastener 54 for locating and securing the channel producing structure 52 to the first cavity 44. The channel producing structure 52 also includes a recess generating portion 56 which extends within the periphery of the channel producing structure 52 to create a recess 28.

Once the skin 20 is formed with a channel and sufficiently cooled, the skin 20 is filled with foam to form the foam cushion 26 within the skin 20. Referring to FIG. 4, a foam tool is generally indicated at 58. The foam tool 58 includes a hinged foam mold 60 having an opening 62 at the top thereof. Foam is inserted into the skin 20 at the opening 62. The hinged foam mold 60 is conditioned and the skin 20 is foam filled within the hinged foam mold 60. After a predetermined time, the head rest assembly 14 is removed from the foam tool 58.

Another step in the method of fabricating the head rest assembly 14 includes the step of applying the insert 22 to the recess 28 of the skin 20 such that the peripheral edge 23 of the insert 22 is received by the channel 30. The insert 22 may become a part of the head rest assembly 14 in one of two methods. In the first method, the insert 22 is applied to the skin 20 after the head rest assembly 14 is removed from the foam tool 58. The insert 22 is automatically placed on the recess 28 and into any channel 30. Alternatively, the insert 22 may be inserted into the recess 28 and channel 30 manually.

Once the insert 22 is in place with its periphery extending into the channel 30, the head rest assembly 14 is placed into a reactivating assembly, generally indicated at 64. The reactivating assembly 64 is a steaming assembly 64 in the preferred embodiment. The reactivating assembly 64 reactivates the adhesive which is adhered to the insert 22 or the skin 20. The reactivating assembly 64 includes a top portion 66 and a bottom portion 68. Each of the top 66 and bottom 68 portions include a cavity to receive the head rest assembly 14 therein. The cavity 70 in the top portion 66 includes a steam delivery portion 72. The steam delivery portion 72 allows steam to be transmitted through a plurality of channels 74 to be evenly distributed over the entire insert 22. The steam is used to melt an adhesive (not shown) located on a back surface 76 of the insert 22 allowing the insert 22 to adhere to the recess 28 of the skin 20. The steam is received by the plurality of channels 74 via a tubing circuit 78 which transports the steam, represented by arrows 80 from a steam generating machine (not shown). A steam vent 80 regulates the steam located within the steam delivery portion 72 of the cavity 70.

Figure 6:
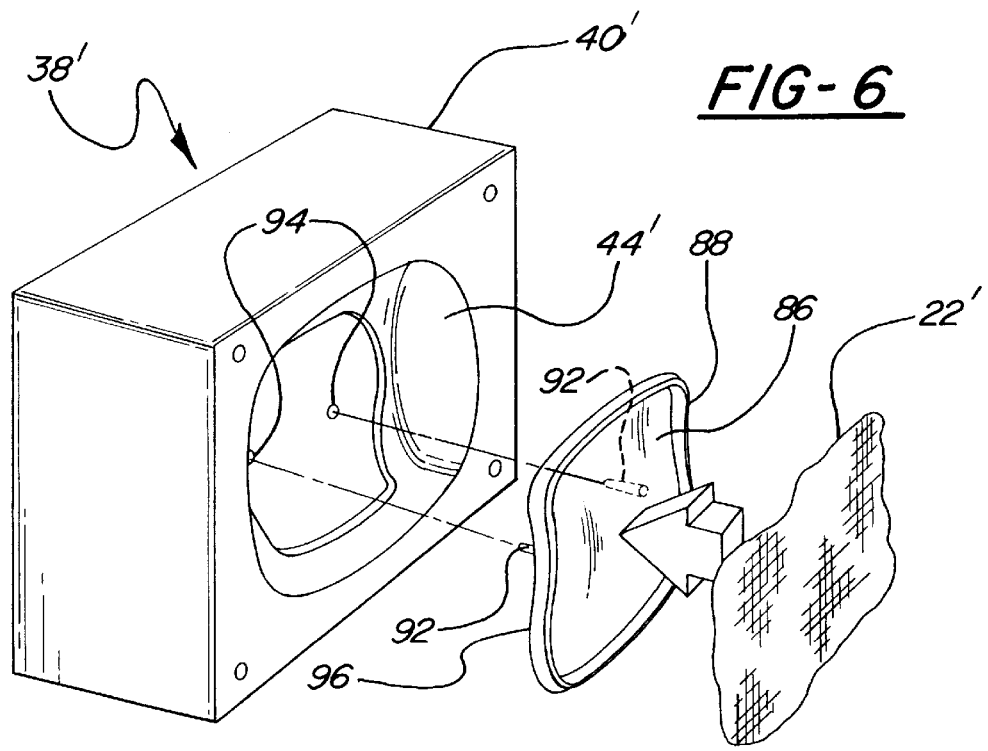
FIG. 6 is an exploded perspective view of an alternative embodiment of the mold assembly.
Figure 7:
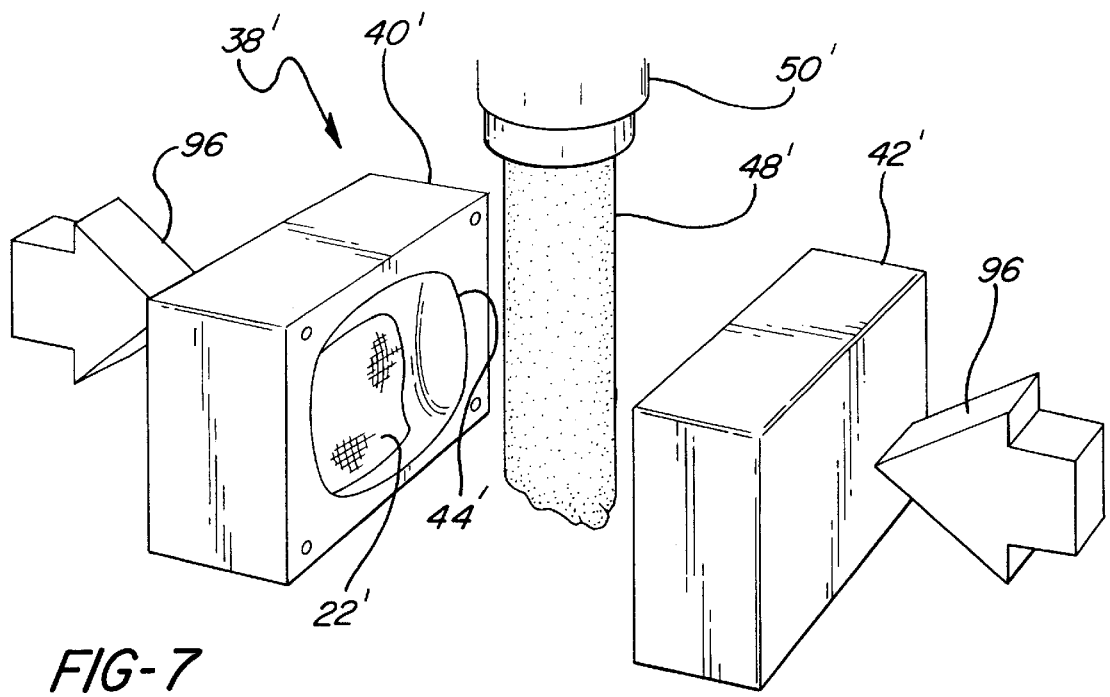
FIG. 7 is a cross-sectional side view of an alternative embodiment of the parison being received by the mold assembly.
Figure 8:
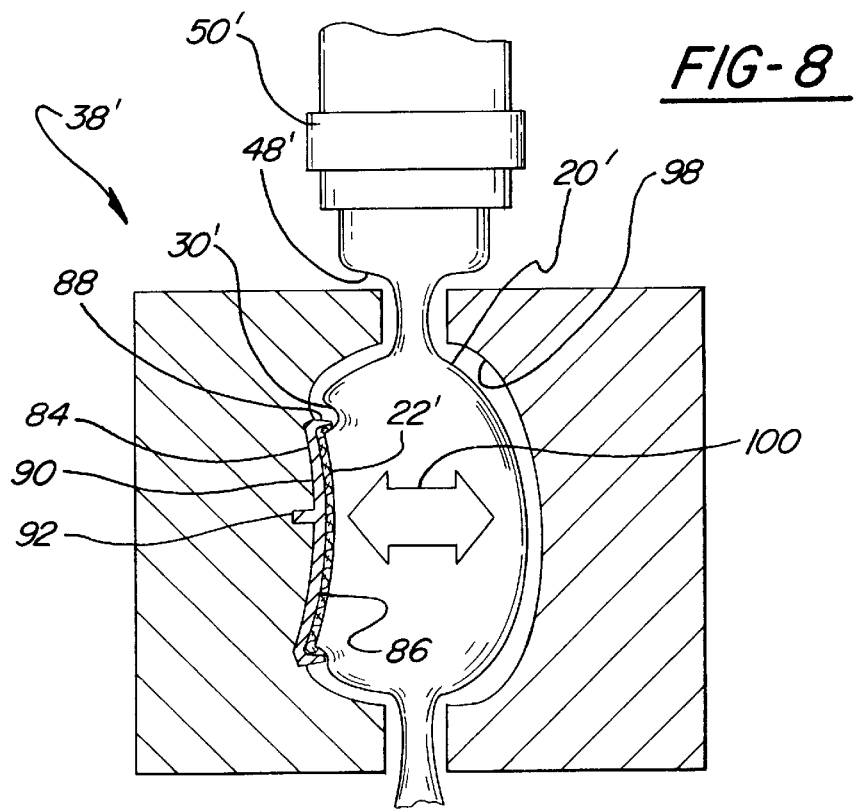
FIG. 8 is a cross-sectional side view of the parison being molded within the mold assembly with the insert being fused and formed.

FIGS. 6 through 8 illustrate an alternative method, wherein like primed numerals represent structures similar to those set forth in the preferred embodiment (FIGS. 1 through 5), an alternative method for adhering the insert 22' to a portion of the skin 20'. In the embodiment shown, the portion is a recess 28' in the skin 20'. The alternative method is different from the method set forth above in that the insert 22' is placed in the first half 40' of the blow mold assembly 38' eliminating the requirement for the steaming assembly 64. More specifically, the recess producing structure 52 in the preferred embodiment is replaced with an insert tool 84. The insert tool 84 is to be received within the first cavity 44' of the first half 40'. The insert tool 84 includes a receiving surface 86 which holds the insert 22' thereon until the insert 22' is molded to the parison 48'. The receiving surface 86 defines a surface periphery 88 which extends out from the receiving surface 86. The surface periphery 88 forces the periphery of the insert 22' to extend outwardly such that it will create the channel 30' in the recess 28' of the skin 20'.

The insert tool 84 also includes a mold surface 90 which is designed to abut the first half 40' of the blow mold assembly 38'. Insert fasteners 92 secure the insert tool 84 to the first half 40'. The first cavity 44' includes receptors 94 for receiving the insert fasteners 92 therein.

Once the insert 22 is in place within the first cavity 44', the parison 48 is blown to its desired size at which time the first half 40' and the second half 42' of the blow mold cavity 38' are moved in directions shown by arrows 96 to create a mold cavity 98 to mold the skin 20' as desired. The skin 20' is generated with the insert tool 84 and the insert 22' in place. As is shown in FIG. 8, the pressure within the parison 48, graphically represented by arrow 100, creates the channel 30' allowing the insert 22' to extend in a manner flush with the skin 20 to create a composite blow molded article 14 with a surface that is created by two separate materials having as little separation therebetween.

Once the skin 20' is formed, it is removed from the blow mold assembly 38'. The skin 20' is then inserted into the foam tool 58, shown in FIG. 4, where the foaming process set forth in the preferred embodiment is identical to the process of the alternative embodiment.

After the head rest assembly 14 is removed from the foam tool 58, the necessary steps of removing excess foam 26 therefrom is performed to clean the head rest assembly 14 resulting in a finished product.

As was stated above, the head rest assembly 14 is used merely as an example for all composite blow molded articles which may be created using the tools and methods set forth above.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A headrest assembly for a vehicular seat, said headrest assembly comprising:

a rigid frame having a stem to be received by the vehicular seat;

a foam cushion surrounding a portion of said rigid frame, said foam cushion disposed adjacent the vehicular seat;

a skin covering all of said foam cushion, said skin including a channel extending into said skin a predetermined length; and an insert defining a peripheral edge, said insert fixedly secured over said skin wherein said peripheral edge of said insert is disposed within said channel of said skin.

2. A headrest assembly as set forth in claim 1 wherein said channel includes a recess extending within a recess periphery defined by said recess.

3. A headrest assembly as set forth in claim 2 wherein said periphery of said recess extends out to said channel.

4. A headrest assembly as set forth in claim 3 wherein said skin defines an opening periphery smaller than said recess periphery.

5. A headrest assembly as set forth in claim 4 wherein said skin includes an undercut extending from said opening periphery down to said recess periphery.

6. A headrest assembly as set forth in claim 5 wherein said undercut extends into said channel at 285° with respect to said skin.

7. A method for manufacturing a headrest assembly including a rigid frame, a foam cushion, a skin and an insert to be permanently secured to the skin, the method comprising the steps of:

forming the skin with a channel;

filling the skin with foam to form the foam cushion within the skin; and attaching the insert to an outer surface of the skin such that a peripheral edge of the insert is disposed within the channel whereby the insert is permanently secured to the outer surface of the skin.

8. A method as set forth in claim 7 including the step of applying an adhesive between the skin and the insert.

9. A method as set forth in claim 8 including the step of applying steam to the insert to heat the insert and the adhesive.

10. A method for manufacturing a headrest assembly including a rigid frame, a foam cushion, a skin and an insert, the method comprising the steps of:

loading the insert into an insert tool;

securing the insert tool in a blow mold tool;

forming the skin in the blow mold tool;

adhering the insert to the skin inside the blow mold tool; and filling the skin with foam to form the foam cushion within the skin.

11. A method as set forth in claim 10 including the step of applying an adhesive to the insert on a surface free from the insert tool.

12. A blow mold assembly for producing a composite skin, said blow mold assembly comprising:

a first half defining a first cavity to receive a portion of a parison therein;

a second half defining a second cavity to receive another portion of the parison therein; and an insert tool securable to said first half completely within said first cavity to hold an insert thereon such that the insert is received by and formed into the parison as it forms within said first and second halves.

13. A blow mold assembly as set forth in claim 12 wherein said insert tool includes a receiving surface for holding the insert thereon until the insert is molded to the parison.

14. A blow mold assembly as set forth in claim 13 wherein said receiving surface defines a surface periphery extending out from said receiving surface.

15. A blow mold assembly as set forth in claim 14 wherein said insert tool includes a mold surface to abut said first half.

16. A blow mold assembly as set forth in claim 15 wherein said mold surface includes fasteners for securing said insert tool to said first half.

17. A blow mold assembly as set forth in claim 16 wherein said first half includes receptors for receiving said fasteners.

18. A composite blow molded article comprising:

a foam cushion;

a skin covering all of said foam cushion, said skin including a channel defining a recess periphery; and an insert defining a peripheral edge fixedly secured to said skin over said skin wherein said peripheral edge of said insert is disposed within said channel.

19. A composite blow molded article as set forth in claim 18 wherein said skin defines an opening periphery smaller than said recess periphery.

20. A composite blow molded article as set forth in claim 19 including an undercut extending from said opening periphery of said skin down to said recess periphery.

21. A composite blow molded article as set forth in claim 20 wherein said undercut extends into said recess at 285° with respect to said skin.

22. A composite blow molded article as set forth in claim 21 including a rigid frame extending through said foam cushion.

* * * * *